March 30, 1971   J. D. PETERSON   3,573,090
METHOD OF APPLYING A PLASMA SPRAY COATING
Filed Dec. 9, 1968   2 Sheets-Sheet 1

*INVENTOR.*
JOHN D. PETERSON
BY Charles M. Hogan
Abraham Ogman
ATTORNEYS

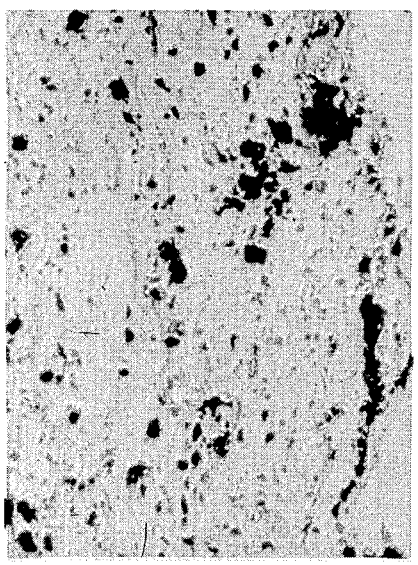
FIG. 4      250X
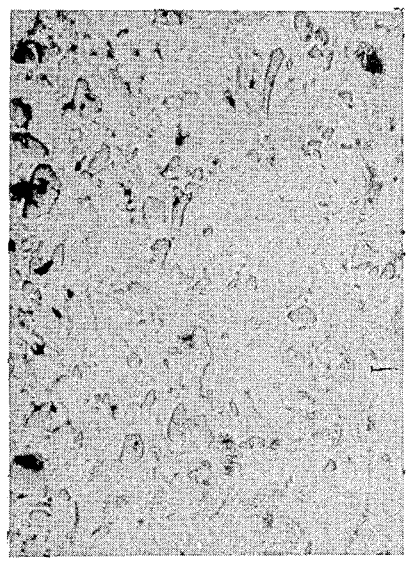
FIG. 5      250X
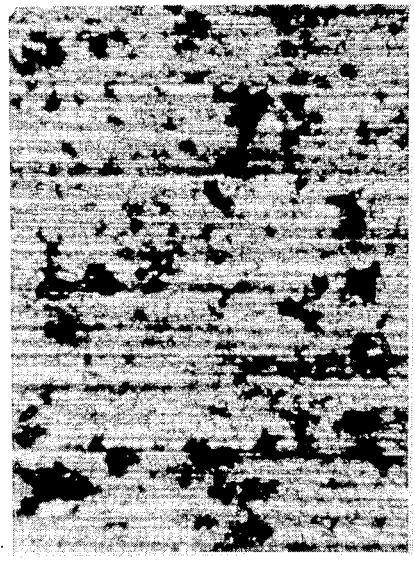
FIG. 6      150X
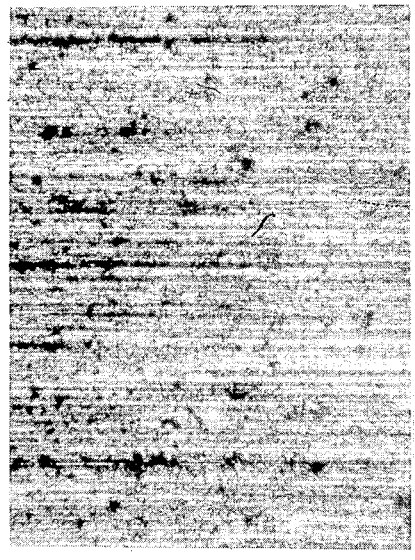
FIG. 7      150X
JOHN D. PETERSON
INVENTOR

3,573,090
METHOD OF APPLYING A PLASMA SPRAY COATING

John D. Peterson, North Grafton, Mass., assignor to
Avco Corporation, Cincinnati, Ohio
Filed Dec. 9, 1968, Ser. No. 782,095
Int. Cl. B44d 1/097
U.S. Cl. 117—93.1                                    7 Claims

ABSTRACT OF THE DISCLOSURE

There is described herein a method of obtaining a high-quality, high-density plasma spray deposited coating through the use of high velocity plasma effluent, preferably formed from a mixture of diatomic and a monatomic gas. The mass flow rate of effluent and the cross sectional area of the effluent exit orifice is adjusted to overcome the difficulty of heating the material being sprayed to a plastic state in the short time that the material is in residence in the effluent.

---

In a conventional plasma flame spray deposited process, an electrical arc is generated in a stream of gas. Generally the gas is an inert gas to avoid deterioration of the equipment, but at times a more active gas such as hydrogen and nitrogen is used. The gas into which the arc flows is converted into a plasma effluent. That is to say a quantity of the gas is ionized, although the entire mass remains electrically neutral. Ionization occurs due to the fact that the gas absorbs heat from the electric arc. After the gas is ionized, the plasma continues to absorb heat, energy and plasma effluent temperatures of ten to 30,000 degrees Kelvin are commonplace.

The material that is to be deposited on a substrate is first fluidized, i.e., suspended in a fluid stream, usually in the same gas that is converted to plasma. The fluidized powder is injected into the plasma effluent; it mixes with the effluent and the mixture is propelled toward or against a substrate. During the time that the coating material is in residence in the plasma effluent, its temperature is raised so that it reaches a plastic state. On impacting on the substrate, the coating material cools very rapidly and through the process of adhesion, cohesion and mechanical interlocking of particles, remains as a coating on the substrate.

For the purpose of this discussion plasma effluents derived from conventional practices are classed as low velocity effluents. While it is not possible to obtain quantitative velocity values, there is little doubt that there is a substantially higher effluent velocity emanating from plasma generators geared to the teachings of this invention.

Additionally high density coatings generated in conventional practice are in the vicinity of 90% of theoretical density. Objective high density coatings of this inventive process exhibited densities of 95–99% of theoretical density.

Plasma spray coatings have in the past suffered from the presence of large pores or voids in excessive quantity so that the full capabilities of the coatings have not been realized.

The pores formed by prior art processes, because of their size and frequency, do not form a high efficient oxidation barrier if the purpose of the coating is to prevent oxidation of the substrate. The wear characteristics of a conventional porous coating is decidedly less desirable than the wear characteristics of the coating material per se in a fully dense configuration. Carbides are oxidized to a disturbing extent. It is also virtually impossible to provide a high quality surface finish in coatings containing a great deal of porosity. Characteristically, with a given material, uniform hardness measurements reflect a coating structure; a uniform average hardness indicates uniform structure and density.

Spray deposited coatings which avoid the limitations noted above have been obtained through the use of a flame spray process in which a fuel and oxygen are ignited in the presence of coatings particles. The particles are propelled by the combustion products, through a long barrel resembling a rifle of a small bore cannon. The powders remain in residence within the high temperature gas for a extended period of time and also achieve a high velocity. This flame process, because of its explosive nature and dangerously high noise level and massive equipment structure needs be practiced in a separate "block house" type structure.

The above flame described flame spray process does not permit equipment mobility so that work must be brought sometimes from long distances to the coating apparatus. Heretofore, plasma equipment was thought to be incapable of forming high-density coatings comparable to that prepared using this aforementioned flame spray high-velocity system. The short residence time of a coating particle in an effluent of 2 to 10 inches in length was thought to be not long enough to heat the coating particle to a plastic state. The short residence time was also believed to be insufficient to accelerate a particle to a relatively high velocity.

Finally, difficulty was to be expected in feeding a particle to the effluent. At best, the coating particle feed velocity was to be critically controlled to assure adequate penetration into the effluent, while at the same time avoiding the possibility of the particle passing completely through the effluent. Much coating material was lost by deflection from an unsuitable effluent configuration. Additionally, the higher normal powder feed velocities that were considered necessary to penetrate into the high velocity effluent would present difficulties for the average powder feeder.

It is an object of the invention to provide a process for making a spray deposited coating which avoids limitations and disadvantages of prior art processes.

It is another object of the invention to provide a process for producing a unique plasma spray deposited coating.

Another object of the invention is to provide a process for making a coating of high density.

Another object of the invention is to establish process parameters for obtaining improved plasma spray deposited coatings.

It is yet another object of the invention to provide means for coating materials with a high-velocity plasma effluent.

Another object of the invention is to provide a coating having a high density with small isolated and widely dispersed pores having a circularly cross-sectioned appearance, and essentially isolated.

In accordance with the invention, a method of depositing a plasma spray coating on a substrate comprises the steps of supplying a gas to a plasma generator at a predetermined mass flow rate and passing an electric arc through the gas for converting it to a plasma effluent. The plasma effluent leaves the plasma generator via an exit nozzle having a predetermined exit orifice area. Particles of the coating material are mixed with the effluent, converted to a plastic state, and projected to a substrate by the plasma effluent where a coating is developed.

Also in accordance with the invention a method of depositing a plasma spray coating on a substrate comprises the steps of supplying a mixture of a diatomic gas and a monatomic gas to a plasma generator. An electric arc is passed through the gas mixture for converting the gas mixture to plasma effluent. Irregularly shaped particles of a coating material are mixed with the plasma effluent and heated to a plastic state. The plastic particles are propelled by the plasma effluent to a substrate, where they are deposited as a coating.

The selection of mass flow rate and orifice area is made from values defining a coordinate within the parallelogram in FIG. 3 having coordinates (10, 0.07) (25, 0.07) (1.5, 0.01) (3.6, 0.01) of a log-log graph of the orifice area as a function of mass flow of the plasma gas.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 4 is a photomicrograph of a coating produced by prior art plasma spray processes;

FIG. 5 is a photomicrograph of a coating produced in accordance with the present invention;

FIG. 6 is a photomicrograph of a finished surface of a prior art plasma spray deposited coating; and FIG. 7 is a photomicrograph of a finished surface of a coating made in accordance with the present invention and finished under conditions identical to those of FIG. 6.

Surprisingly, in spite of all of the very logical reasons of why a high velocity plasma system would not work, a satisfactory process was developed largely through empirical testing and observations. The reason or reasons why this procedure works is not known with certainty. However, it is possible to define process parameters which provide reproducible high quality and high density plasma spray coatings.

Figures 1, 2:
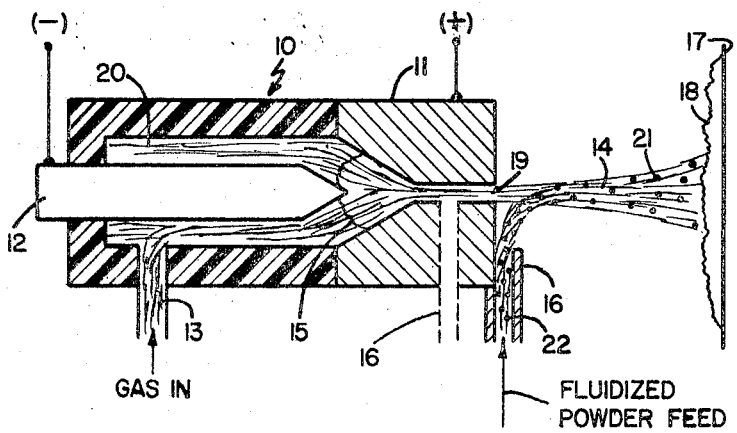
FIG. 1 is a schematic representation of a cross section of a plasma spray coating equipment.
FIG. 2 is a front view of the FIG. 1 schematic representation depicting particularly the configuration of the exit orifice.

Referring to FIG. 1 of the drawings, there is shown schematically a plasma generator 10 containing a nozzle anode 11 and a cathode 12. The cathode 12 is shown in a coaxial configuration with an exit orifice 19 of the nozzle 11.

Typically, a gas, usually an inert monatomic gas such as argon or helium, is supplied to the plasma generator 10 via an inlet 13. That gas passes through the compartment 20 and exits through the exit orifice 19. Before leaving the plasma generator 10, the gas passes between the cathode 12 and the anode 11 and electric arc 15 is developed through the gas. Heat from the arc 15 is absorbed by the gas and the gas is formed into a plasma. The plasma leaves the plasma generator 10 through the orifice 19, as a plasma effluent 14.

To form a spray deposit coating, coating material in the form of fine particles 21 are supplied as a fluidized stream of particles 22 through conduit 16 to the plasma effluent 14. Generally, the powder feed is fluidized with the same type of gas that is used to form the plasma effluent 14. The fluidized stream of particles 22 enters the plasma effluent 14 is mixed therewith and projected by the plasma effluent 14 toward a substrate 17. In transit, the particles absorb heat from the plasma effluent and are accelerated in velocity by the plasma effluent 14. On reaching the substrate 17 the particles are in a plastic state and deposited out of the effluent on the substrate 17. The accumulation of the particles deposited on the substrate 17 forms a coating 18. The coating 18 is bonded to the substrate 17 both mechanically and by adhesive forces and cohesive forces.

In the alternative the conduit 16 may be constructed through the anode 11 as depicted by the dashed outline 16 or in other locations consistent with the criteria to be presented.

Thus far, a conventional plasma coating operation has been described. A high density coating is developed by producing a high velocity effluent taken alone or in combination with one or more of the following factors: Firstly, the high velocity process may be practiced with a single component plasma gas such as argon, helium, nitrogen, etc. Generally argon is used as it is the most economical noncorrosive gas. The high velocity argon process may be improved by using a mixture of diatomic gas and the monatomic argon to form the plasma effluent; secondly, the exit orifice 19 is formed in the oval configuration shown in FIG. 2 and finally the coating particles are formed in an irregular surface configuration.

Figure 3:
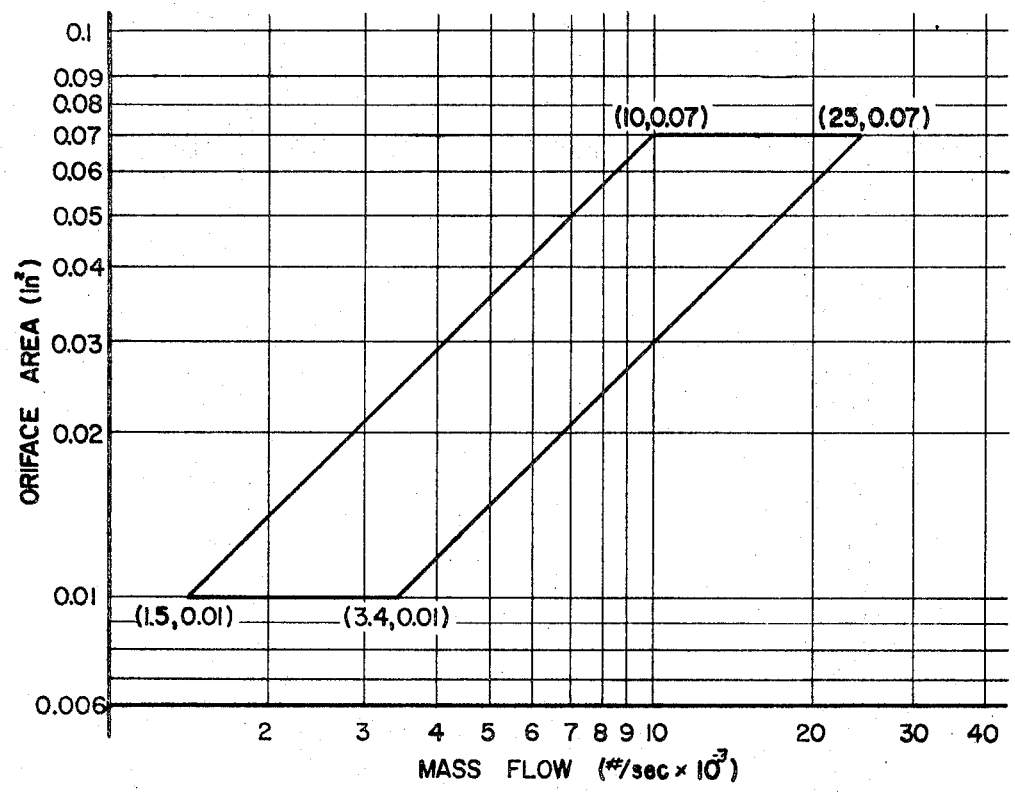
FIG. 3 is a curve useful in defining and explaining the invention.

Referring to the fundamental criteria of high velocity, attention is directed to FIG. 3, which contains a curve useful in explaining the operation and performance of the invention. FIG. 3 is a standard log-log representation of the cross-sectional area of the exit orifice 19, as a function of mass flow of the plasma feed gas entering the inlet 13. The critical area is defined as a parallelogram more fully identified by its coordinates. If the point identifying the selected combination of mass flow and orifice area falls on the lines defining the parallelogram or within area enclosed by the parallelogram, a high quality, high density coating of the type being considered herein will be generated.

In the event the coordinate defining the mass flow and orifice area falls outside of the parallelogram, a coating of substantially poorer quality will result. The FIG. 3 parallelogram is defined by the coordinates (10, 0.07) (25, 0.07) (1.5, 0.01) (3.6, 0.01).

In speaking of high velocity, only a qualitative measure is available. It is clear that the velocity of the plasma effluent under the conditions defined by the parallelogram in FIG. 3 is much higher than the plasma effluent generated under normal prior art practices.

It is not possible to obtain a quantitative evaluation of velocity of the plasma effluent. In the first place, one cannot assign a density to the gas or plasma, since the temperatures within the gas and/or plasma are not known and are not constant radially or axially. The temperatures cannot be measured because those instruments which can survive the extremely high temperatures of the plasma effluent alter the flow patterns of the effluent and affect the temperature thereof. It is not possible to speculate on what effect the ionization has. About 1 to 7% of the molecules in the plasma exist in an ionized and highly kinetic state. Finally, it is not possible to assess or assign a Reynolds number to the flow in the exit nozzle. Because of the foregoing, it was necessary to resort to other means, to the FIG. 3 to define the process parameters which give rise to the improved coating.

Typical process parameters for coatings developed using conventional prior art practice and coatings employing the high velocity process parameters are outlined in the table.

TABLE

| | Conventional | | Hi velocity |
|---|---|---|---|
| Nozzle area, in$^2$ | 0.0426 | 0.0186 | 0.0186 |
| Plasma gas type | A | A | 90.5%A/9.5%N |
| Plasma gas mass flow rate, No./sec | 1.96×10$^{-3}$ | 4.41×10$^{-3}$ | 3.65×10$^{-3}$ |
| Spray distance, in | 3½ | 3½ | 3½ |
| Coating material | 80 WC/20 Co | 80 WC/20 Co | 80 WC/20 Co |
| Coating density (estimate), percent | 88–90 | 92–95 | 95–98 |
| Coating hardness DPH$_{300}$ (ave.) | 345 | 252 | 405 |
| Surface finish (typical), RMS | 8–12 | 3–6 | 2–4, |

A coating developed through the use of a 0.0436 in.$^2$ nozzle and 7.8×10$^{-3}$#/sec. argon was satisfactory, though gas consumption was very high. A 0.186 in.$^2$–2.94×10$^{-3}$#/sec. nozzle area-mass flow combination also produced a satisfactory coating.

However, the combination of 0.186 in.$^2$ and $$2.10 \times 10^{-3} \#/\text{sec.}$$

fell outside of the FIG. 3 parallelogram and predictably produced a poor low density coating.

Certain things are discernible from the foregoing. Several other factors need explanation.

Note the use of very small area's nozzle orifices with an accompanying increase in the mass flow rate of the plasma gas. Both factors contribute to a valid high velocity system producing high density coatings.

Significant improvement in surface finish can be obtained with high velocity derived coatings.

The greater hardness of the conventional coating, in comparison with coatings made under high velocity conditions using pure argon, is attributed to the formation of cobalt oxide. The residence time of the coating particles in the low velocity stream provides adequate time for the formation of oxides.

It is known that diatomic gases give up heat more readily than monatomic gases. See Plasma Flame Spraying Equipment Development by Robert M. Nadler—Technical Engineering, 1960. It is also common practice to avoid the use of diatomic gases such as hydrogen and nitrogen, either alone or in combination, to form plasmas since these gases have a deleterious effect. A very drastic and substantial reduction in the life of plasma components, notably the anode, is observed when these gases are used.

In combination with the concept of using a high velocity, nitrogen and argon were mixed, and the mixture converted to a plasma. Up to 20% volume of nitrogen produces a demonstrable improvement in the coating quality. See the table. That is to say, coatings having fewer and smaller pores than coatings produced through the use of high velocity argon alone were generated. A small but tolerable deterioration in equipment components was observed.

Improved results were observed with even small percentages of nitrogen. The results produced improved as the percentage of nitrogen increased. Above 20% nitrogen any incremental improvement in the coating was more than offset, economically, by an incremental reduction in component life. A limiting parameter appears to be 20% nitrogen.

As might be expected, the deposition efficiency decreased as the coating particles have less time to absorb heat and become plastic. In the high velocity plasma effluent using pure argon a 25–30% decrease in the efficiency results. This is tolerable in view of the vastly improved quality of the coatings. The decrease in deposition efficiency was noted, in particular, in connection with clad ceramic particles having an approximate spherical shape.

The deposition efficiency was brought back to at least the values obtained in conventional low velocity spraying through the utilization of an irregularly shaped coating particle. Sintered particles of single phase or composite materials provide a texture surface having improved heat absorption properties. Particles formed by crushing are highly satisfactory. In contrast atomized particles and clad particles, particularly metal clad particles, have little or no texture and exhibit lower deposition efficiencies.

Graphic comparison of results obtained through the use of conventional low velocity practice and the high velocity inventive concept are illustrated in FIGS. 4–7. FIG. 1 is a cross-section of a conventional low velocity coating tungsten carbide-cobalt. It contains large pores, irregularly shaped pores, and numerous pores.

FIG. 5 is a photomicrograph of a tungsten carbide-cobalt coating made in accordance with the inventive concept. It contains small pores essentially circular in cross section and clarly isolated from each other, the pores are very few in number. Interestingly the retained carbide of the high velocity coating is significantly higher.

The most reliable test to determine the quality of the coating is an average hardness test, and the examination of photomicrographs. The hardness is directly related to the density providing there is no significant conversion of material to an elemental or oxide, since under low velocity or high velocity conditions, the hardness of the coating material per se is the same. A lower hardness number indicates a large number of large pores. A high hardness number is an indication of a very dense coating containing few isolated small pores. Coating of the type shown in FIG. 5 exhibits typically, high hardnesses.

Two representative coating surfaces were ground under idential grinding conditions. The surface depicted in FIG. 6 was formed by prior art low velocity processes. The FIG. 7 surface was formed using parameters embodying the present invention. Apart from the very obvious visual differences in the coating finish, the prior art surface had a surface roughness of 8–10 RMS and the inventive surface had a 2–4 RMS finish, a very material improvement and directly attributable to the lower frequency of pores.

In summary, a way of making extremely high density high quality plasma spray coatings has been described. These coatings are comparable to those made using very expensive, very elaborate, and very sophisticated equipment. The procedures described utilizes high velocity plasma effluent in a way that defies theoretical practicality. Improvements over the basic high velocity processes are embodied in the use of a mixture of diatomic and monatomic gases as the plasma feed gas, and the use of irregularly shaped coating particles for improved deposition efficiency, as well as a judiciously configured plasma effluent.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. A method of depositing a plasma sprayed coating on a substrate comprising the steps of:
   supplying gas at a mass flow rate 0.0015 to 0.025 pound per second to a plasma generator having an exit orifice having a cross-sectional area of 0.01 to 0.07 square inch the exit orifice area and mass flow rate form a coordinate within the area defined by a parallelogram defined by the coordinates (10, 0.07) (25, 0.07) (3.4, 0.01) (1.5, 0.01), of a log-log graph of exit orifice area as a function of mass flow of the plasma gas;
   passing an electric arc through the gas mixture for converting the gas mixture to a plasma effluent;

mixing particles of a coating material with said plasma effluent for conditioning said particles for deposition on a substrate; and directing combination of plasma effluent and particles to a substrate to deposit said particles on said substrate as a coating.

2. A method of depositing a plasma sprayed coating on a substrate as defined in claim 1, wherein the gas is a mixture of diatomic and monatomic gases.

3. A method of depositing a plasma sprayed coating on a substrate as defined in claim 2 wherein the diatomic gas is nitrogen and the monatomic is argon.

4. A method of depositing a plasma sprayed coating on a substrate as defined in claim 3 wherein the percentage of nitrogen is at most 20% by volume.

5. A method of depositing a plasma sprayed coating on a substrate as defined in claim 1 wherein said plasma effluent is shaped initially to have a flat surface.

6. A process as described in claim 5 wherein the particles are inserted into the effluent in a fluidized stream directed perpendicular to the flat surface.

7. A process as described in claim 1 wherein the particles have an irregular textured surface.

References Cited

UNITED STATES PATENTS 2,960,594  11/1960  Thorpe _____ 117—93.1PFS

ALFRED L. LEAVITT, Primary Examiner

J. H. NEWSOME, Assistant Examiner

U.S. Cl. X.R.

117—17, 105.2; 118—620; 219—76; 239—81

PO-1050
(5/69)

UNITED STATES PATENT OFFICE
CERTIFICATE OF CORRECTION

Patent No. 3,573,090      Dated March 30, 1971

Inventor(s) John D. Peterson

It is certified that error appears in the above-identified patent and that said Letters Patent are hereby corrected as shown below:

Column 2, line 20, for "a" read --an--; line 25, omit "flame".
Column 5, in the TABLE, line 1, for "Nozzle area, in$^2$ ---------- 0.0426   0.0186   0.0186" read --Nozzle area, in$^2$ ---------- 0.0436   0.0186   0.0186--. Column 6, line 10, for "clarly" read --clearly--.

Signed and sealed this 12th day of October, 1971.

(SEAL)
Attest:

EDWARD M. FLETCHER, JR.      ROBERT GOTTSCHALK
Attesting Officer            Acting Commissioner of Patents